Patented Mar. 2, 1937

2,072,460

UNITED STATES PATENT OFFICE 2,072,460

CERAMIC TILE COMPOSITION

Andrew Malinovszky, South Gate, Calif., assignor, by mesne assignments, to Malinite Corporation, Los Angeles, Calif., a corporation of California No Drawing. Application March 13, 1933, Serial No. 660,567

7 Claims. (Cl. 106—11)

This invention relates to a composition especially adapted for the manufacture of ceramic articles such as decorated wall, floor and roofing tiles. The composition of this invention is characterized by the presence of a pre-fused material such as glass, and of a magnesia-containing mineral, the glass acting as a binder so that the resulting tile consists of a ceramic body comprising a discontinuously associated glassy matrix in which a substantially dehydrated or calcined magnesium-containing mineral is held in suspension. Furthermore, the composition of this invention permits very material savings in time consumed during the manufacture of the tile and also permits the development of bright glazes thereon.

According to the current practice in making ceramic tiles, a period of 30 to 60 days is required. This length of time is consumed in burning the tile bodies to maturity and cooling the same. Glazing materials are then applied to the cooled tile and another protracted period of time spent in raising the burned tile to a temperature sufficiently high to mature the glaze.

Clays and feldspars are used in the ordinary tile compositions. Feldspars, in order to function as bonding materials, have to be heated to very high temperatures as it is only at temperatures in excess of 2200° F. that these materials soften sufficiently to act as bonding ingredients. Clays, on the other hand, contain large quantities of chemically combined water and carefully controlled gradually increasing temperatures must be used during the burning of the green molded tile in order to drive off the combined moisture without disrupting an excessively large proportion of the molded bodies. Clays and feldspars are also subject to large volume changes with changes in temperature and again the drying and burning operations must be carried out slowly and carefully so as to prevent the rapid volumetric changes from shattering or cracking the molded bodies.

It has been discovered that ceramic bodies molded from compositions consisting essentially of magnesia-containing minerals and glass may be burned to maturity at relatively low temperatures and in a remarkably short period of time. Furthermore, during burning a linear shrinkage of the order of only 1% to 1½% is exhibited whereas the clay and feldspar tile of the prior art exhibited during drying and burning shrinkages of 5% to 7%. In addition, the burned tile made from the composition of this invention are remarkably strong and are capable of receiving and tenaciously holding glazes surpassing in all of their physical properties the clay tiles of the prior art. Although some attempts have been made to use talc in prior compositions, talc has not been combined with glass nor have similar compositions been made without the addition of appreciable quantities of lime.

It is an object of this invention, therefore, to disclose and provide a ceramic composition which may be molded and burned to maturity in a very short period of time.

Another object of the invention is to disclose and provide a ceramic composition consisting essentially of glass and a magnesio-containing mineral.

A further object of the invention is to disclose and provide a ceramic tile or other molded body consisting essentially of a glassy matrix containing discontinuously associated particles of magnesia-containing mineral.

These and other objects, uses and advantages of the invention will become apparent to those skilled in the art from the following detailed description of a preferred composition and its method of utilization.

As has been stated hereinbefore, the major ingredients of the composition of this invention are a magnesia-containing mineral such as soapstone, steatite or serpentine, and ground glass. By the term "glass" as used herein, reference is made to the common form of glass often referred to as "soda lime glass", although lead-containing glasses may also be used. In addition to these two major ingredients, the composition includes a relatively small amount of clay or kaolinite. A very minor percentage of silica may also be added, although this latter addition is not essential and is merely employed when it is desired to suitably vary the coefficient of expansion of the finished body.

These three ingredients may be ground either separately or together to a fine state of division, that is, to a state of division sufficient to permit the mixture, after being moistened with water or other suitable liquid, to be molded. Reduction to 40 to 100 mesh is satisfactory for most purposes.

The three ingredients mentioned hereinabove are present in the ceramic body in the proportion of from 10% to 55% by weight of ground glass, from about 28% to 60% by weight of the magnesia-containing mineral such as soapstone, and from 3% or 4% to not more than about 30% of clay. Preferably the amount of clay is kept low, that is, not to exceed about 15%. More than 50% of the total mass should in all cases consist of the glass and the magnesia-containing mineral. Furthermore, the magnesia-containing mineral is preferably used in a dry or substantially dehydrated or calcined form.

As an illustrative example of a composition found to be suitable for the manufacture of ceramic tiles, reference is made to the following:

| | Per cent |
|---|---|
| Ground glass (soda lime) | 30 |
| Steatite | 54 |
| Clay | 8 |
| Silica | 4 |

After the ingredients have been reduced to a suitable state of division and mixed, they may be moistened with water and molded into the desired shape under a pressure to give sufficient coherence and density to the molded body. Such molded bodies may then be burned to maturity very rapidly. For example, after the bodies have been dried, they may be placed in a preheated furnace and there subjected to temperatures of from about 1600° F. to 2200° F. The maturing temperature will, of course, be influenced by the amount of glass present in the composition. The specific example given hereinabove may be burned to maturity at a temperature of about 1800° F. by permitting the tile to remain in a zone heated to 1800° F. for a period of only 15 to 20 minutes. If a higher temperature were to be used in the heating zone, the period of time may be reduced to 10 minutes or even less. Within the range of proportions given, practically all of the bodies may be burned to maturity at the temperatures indicated in less than 1 hour. When it is desired to employ slightly lower burning temperatures or to cut down on the time of burning, small percentages of a flux such as lead oxide, may be added to the body. Ordinarily not more than ½% to 2% of lead oxide should be added.

If continuous kilns of the tunnel type are employed, the rate at which the unburned bodies travel through the kiln may be greatly speeded up so that the pre-heating or drying may be accomplished in from 1 to 2½ hours, the tile subjected to a maturing temperature for only 5 to 30 minutes, and then rapidly cooled. The cooling time may be cut down to as low as 1 hour, thereby permitting the tile to be dried, pre-heated, burned to maturity and cooled, all within a period of 3 to 4 hours.

This ability of the tile to be burned to maturity in a very short period of time is one of the distinguishing features and characteristics of the composition of this invention. As stated hereinbefore, the burning of ordinary tile bodies consisting essentially of clay and feldspar consumes several days but as stated, the composition of this invention may be burned in but a few hours.

It will be found, furthermore, that the shrinkage of the bodies during burning does not materially exceed 1% and will range from about 0.7% to 1.6%. This remarkably low shrinkage permits the production of accurately sized products.

During the burning operation, the glass present in the molded body softens and forms a glassy matrix which holds the more refractory magnesia-containing material in suspension. Contrary to expectations, however, the product is not brittle but instead is tough and tenacious so that the resulting tile may be readily shipped and handled with less breakage than is encountered in the handling and shipment of clay tile.

In view of the fact that the chemical analyses of magnesia-containing materials, glass and clay vary, the following ranges of chemical components which may be present in bodies coming within the scope of this invention may be of assistance in properly proportioning the ingredients. Bodies made in accordance with this invention, the major portion of the bodies being composed of glass and magnesia-containing minerals, may have a chemical analysis as follows:

| | Per cent |
|---|---|
| $SiO_2$ | 40 to 70 |
| $Al_2O_3$ | 2 to 12 |
| MgO | 15 to 50 |
| CaO | 5 to 8 |
| NaO | 2 to 6 |
| PbO | 0 to 6 |

The lime referred to in this analysis originates as an impurity in the talc, tremolite or soapstone used and is not a separately added ingredient.

The molded bodies, after having been burned in the manner described, may then be subjected to a glazing operation and it will be found that the glaze will tenaciously adhere thereto and form an exceptionally good bond with the tile. Glazing materials may be applied to the tile either dry or in the form of a suspension. The glaze-maturing operation, because of the heat-resisting characteristics of the body, may be conducted much more expeditiously than is ordinarily the case with clay tile. As a matter of fact, burning schedules during the glost burning similar to those used during the biscuiting operation described hereinabove, may be employed. If it is desired to produce unglazed tile, then the coloring ingredient can be added to the body directly. Such coloring ingredient may be in the form of clay, iron filings or drillings, or in the form of oxides, frits, etc. Compositions containing such coloring ingredients can then be burned to substantial vitrification so that the resulting tile have a stone-like appearance.

For ordinary wall and decorative tile purposes, the burning operation is merely sufficient to mature the body without destroying all of the porosity of the body. Porosities of from 12% to 22% are preferred as under these conditions a proper bond exists between the tile and the cementing material used in placing them. When floor tile or integrally colored tile are desired, the burning temperatures are raised so as to produce substantially vitrified and dense products.

This application is a continuation of Serial No. 320,539 filed November 19, 1928.

All such changes and modifications as come within the scope of the appended claims are embraced thereby.

I claim:

1. A ceramic composition consisting of about 29% to 60% of magnesia-containing mineral from the group consisting of talc, steatite, tremolite, soapstone and serpentine, 10% to 52% of ground common glass, and from 4% to 30% of clay, said composition being characterized by its ability to form a tough, burned product containing magnesia-containing material in a glassy matrix upon maintaining a body of said composition at a temperature of from about 1600° F. to about 2200° F. for a period of time not exceeding 1 hour, said burned composition being adapted to receive and tenaciously retain a glaze.

2. A ceramic composition consisting essentially of magnesia-containing mineral, ground common glass and clay, and containing from 29% to 60% of magnesia-containing mineral from the group consisting of talc, steatite, tremolite, soapstone and serpentine in substantially calcined form, 10% to 50% of ground common glass and from 4% to 30% of clay, said composition being characterized by its ability to form a tough, burned product containing a magnesia-containing mineral in a discontinuously associated glassy matrix, upon maintaining a body of said composition at a temperature of between 1600° F. and 2200° F. for a period of time not exceeding 1 hour, said burned composition being adapted to receive and tenaciously retain a glaze.

3. A composition for use in the manufacture of ceramic bodies, consisting essentially of magnesia-containing mineral, ground common glass and clay, and containing from 29% to 60% of magnesia-containing mineral from the group consisting of talc, steatite, tremolite, soapstone and serpentine, 10% to 50% of ground common glass and from 4% to 30% of clay, said composition being characterized by its ability to form a tough, burned product upon maintaining a body of said composition at a temperature of between 1600° F. and 2200° F. for a period of time not exceeding 1 hour, and also characterized by its ability to form said body at the temperatures and times stated with a burning shrinkage of not more than about 1.5%, said burned composition being adapted to receive and tenaciously retain a glaze.

4. A ceramic body composed of a dehydrated and burned mixture of 29% to 60% of magnesia-containing mineral from the group consisting of talc, steatite, tremolite, soapstone and serpentine, 10% to 52% of ground common glass and from 4% to 30% of clay, the magnesia-containing mineral being held in suspension in a discontinuously associated glassy matrix, said body being substantially free from free silica and being adapted to receive and tenaciously retain a glaze.

5. A ceramic body composed of a dehydrated and burned mixture of 29% to 60% of magnesia-containing mineral from the group consisting of talc, steatite, tremolite, soapstone and serpentine, 10% to 52% of ground common glass and from 4% to 30% of clay, the magnesia-containing mineral being held in suspension in a discontinuously associated glassy matrix, said body having a porosity of between 12% and 22%, said body being substantially free from free silica and being adapted to receive and tenaciously retain a glaze.

6. A molded and then burned ceramic body composed of the burned products of a mixture consisting essentially of ground common glass, a mineral containing a relatively high proportion of magnesia, and a minor proportion of clay, the magnesia-containing mineral being held in suspension in a discontinuously associated glassy matrix, said body being virtually free from free silica and being adapted to receive and tenaciously retain a glaze.

7. A molded and then burned ceramic body composed of the burned products of a mixture consisting essentially of ground common glass, a magnesia-containing mineral from the group consisting of talc, tremolite, steatite, soapstone and serpentine, and clay, and magnesia-containing mineral constituting from about 29% to 60% of said mixture, said magnesia-containing mineral being held in suspension in a discontinuously associated glassy matrix of said ceramic body.

ANDREW MALINOVSZKY.